United States Patent [19]
Sato et al.

[11] 3,947,393
[45] Mar. 30, 1976

[54] RESIN COMPOSITION FOR LAMINATES AND PREPARED THEREFROM

[75] Inventors: Shunichi Sato; Mineaki Tanigaichi; Kazuyoshi Iwasawa, all of Tokyo, Japan

[73] Assignee: Mitsubishi Gas Chemical Company, Inc., Tokyo, Japan

[22] Filed: July 29, 1974

[21] Appl. No.: 492,817

[30] Foreign Application Priority Data
July 28, 1973 Japan............................... 48-85115

[52] U.S. Cl.............. 260/19 N; 260/19 R; 260/838
[51] Int. Cl.².......................................... C08L 91/00
[58] Field of Search................ 260/19 R, 19 N, 838

[56] References Cited
UNITED STATES PATENTS

| | | | |
|---|---|---|---|
| 1,968,440 | 7/1934 | Elbel et al......................... | 260/19 R |
| 3,781,241 | 12/1973 | Grazen et al...................... | 260/19 R |
| 3,850,874 | 11/1974 | Grazen et al...................... | 260/19 R |

Primary Examiner—M. J. Welsh
Assistant Examiner—W. E. Parker
Attorney, Agent, or Firm—Sughrue, Rothwell, Mion, Zinn & Macpeak

[57] ABSTRACT

A resin composition for laminates excellent in water resistance, electrical properties, mechanical strength, punchability and heat resistance is obtained by blending a drying oil-modified-resol type phenolic resin and a resol type water soluble phenolic resin with a drying oil-phenols-modified mesitylene-formaldehyde resin.

9 Claims, No Drawings

RESIN COMPOSITION FOR LAMINATES AND PREPARED THEREFROM

DETAILED DESCRIPTION OF THE INVENTION

This invention relates to a resin composition for laminates. More particularly, this invention relates to a resin composition for laminates excellent in water resistance, electrical properties, mechanical strength, punchability and heat resistance, which composition is obtained by blending a drying oil-modified resol type phenolic resin and a resol type water soluble phenolic resin with a drying oil-phenols-modified mesitylene formaldehyde resin.

For a long time laminates which are produced by pressing with hot compression of the prepregs in a desired number of sheets obtained by impregnating of a base material with thermosetting phenolic resin varnish and then drying, have been used for electric insulator and in recent years these are also much in demand for printed circuit and also with the remarkable progress of the recent electronics technology use-conditions of said printed circuit have come to severe and the demand for mechanical properties thereof have a marked tendency of becoming more and more higher grade.

To comply with these demands as above mentioned, the production of laminates have been employed a drying oil-modified resol type phenolic resin as impregnating resin varnish. When the prepregs, in which said drying oil-modified resol type phenolic resin is employed as an impregnating resin, are laminated under pressure with hot compression, the complete curing of said resin is effected only in insufficient grade and the releasing of the produced laminates from the pressing plate is bad and this leads to the disadvantages in the operation. Furthermore, thus obtained laminates is inferior in punchability and a tendency of delamination can not be avoided in the punching process and, accordingly, there is accompanied with a defect that said laminates is unsuitable for preparing minimized printed circuit board.

We have engaged in the studies for improving of the properties of laminates produced by the use of such phenolic resin and found that the properties of laminates can be improved by the use of the modified mesitylene formaldehyde resin which may be obtained by reacting alkyl benzenes consisting mainly of $C_9$-aromatic hydrocarbons containing more than 50 percent, preferably more than 70 percent by weight of mesitylene with formaldehyde.

The present invention is concerned with a resin composition to be used for the production of laminates capable of satisfying the performance of the punchability, electrical properties, mechanical strength and the like.

An object of the present invention is to provide a resin composition for producing laminates excellent in punchability, electricl properties, mechanical strength, water resistance and heat resistance.

The other object of the invention is to provide a resin composition comprising (A) a drying oil-phenols-modified mesitylene-formaldehyde resin, (B) a drying oil-modified resol type phenolic resin and (C) a resol type water soluble phenolic resin.

When the resin composition according to the invention, the laminates having desired qualities may optionally be produced by altering the blending proportion of drying oil-phenols-modified mesitylene formaldehyde resin, drying oil-modified resol type phenolic resin and resol type water-soluble phenolic resin.

The resin composition for laminates according to the invention may be prepared by blending (B) a drying oil-modified resol type phenolic resin and (C) a resol type water-soluble phenolic resin with (A) a drying oil-phenols-modified mesitylene formaldehyde resin.

The amount of (A) to be composed is from 5 to 95 parts by weight, based on 100 parts by weight of the sum of (A) and (B) and the amount of (C) to be composed is from 5 to 45 percent by weight based on 100 parts by weight of the sum of (A) and (B).

The drying oil-phenols-modified mesitylene-formaldehyde resin to be used in the resin composition according to the invention is prepared, for example, in a manner as shown under:

A mixture of a mesitylene-formaldehyde resin, drying oil and phenols are reacted at a temperature of between 100° and 300°C for 1 to 5 hours in the presence of an acid catalyst to obtain a mesitylene formaldehyde resin modified with a drying oil and phenols. The modified product is mixed with formaldehyde and the mixture is reacted at a temperature between 50° and 200°C for 1 to 5 hours in the presence of a basic catalyst and followed by dehydration under reduced pressure to produce drying oil-modified mesitylene formaldehyde resin herein referred.

The resin thus obtained is mixed with at least one solvent selected from the group consisting of alcohols such as methanol, ethanol, butanol; ketones such as acetone, methyl ethyl ketone, methyl isobutyl ketone and aromatic hydrocarbons such as benzene, toluene, xylene and the mixture obtained is supplied as impregnating varnish for base materials.

The drying oil-phenols-modified mesitylene-formaldehyde resin before reacting with formaldehyde said above should have an average molecular weight of between about 800 and about 2000.

The mesitylene-formaldehyde resin, drying oil and phenols may be reacted together simultaneously, however, it is also possible either to react at first the mesitylene-formaldehyde resin with phenols or to react at first mesitylene-formaldehyde resin with a drying oil. Exemplifying of the drying oil to be employed in said modification reaction are, for example, tung oil, linseed oil, dehydrated castor oil, oiticica oil, safflower oil, soya bean oil, etc. and though the amount thereof to be used may be altered in accordance with the desired hardness of the produced laminates, it is generally desirable to use less than twenty times by weight based on the mesitylene-formaldehyde resin to be used. Phenols to be utilized comprise phenol; alkyl phenols, such as cresol, xylenol; aryl phenols, such as phenyl phenol, cumyl phenol; halogenated phenols; and further polyhydric phenols, such as bisphenol A. As for the amount of phenols to be used, more than an equivalent weight of phenols refers to that of the mesitylene-formaldehyde resin may be used, however, for attaining a satisfactory improvement in the mechanical processing properties of laminates, it is preferably to use more than three times by weight thereof based on the amount of the mesitylene-formaldehyde resin. Examples of the acid catalyst which may be used in the modification reaction are organosulfonic acids, such as benzenesulfonic acid, toluenesulfonic acis; organosulfonic acid chlorides, such as toluenesulfonic acid chloride; metal halides, such as stannic chloride, zinc chloride, etc.; further inorganic acids, such as phosphoric acid, hydrochloric acid, sulfuric acid, etc.; and organic acids, such as formic acid, oxalic acid, etc.

Formaldehyde used is generally supplied as an aqueous formaldehyde solution, however, if necessary paraformaldehyde, polyoxymethylene ether and further trioxane, etc. may be used therefor. The amount of formaldehyde to be used is from 0.5 to 2.0 mols, preferably from 0.7 to 1.4 mols per mol of phenols. Examples of the basic catalyst which may be used are ammonia; amines, such as hexamethylenetetramine, triethanolamine, ethylenediamine, etc.; alkali or alkaliearth metalhydroxides or carbonates, such as sodium hydroxide, potassium hydroxide, calcium hydroxide, magnesium hydroxide or sodium carbonate, etc.

The mesitylene-formaldehyde resin used herein is an aromatic hydrocarbon-formaldehyde resin which may be obtained by reacting alkylbenzenes mainly consisting of $C_9$-aromatic hydrocarbon containing more than 50 percent by weight of mesitylene with formaldehyde in the presence of an acid catalyst such as sulfuric acid. Recently $C_9$-aromatic hydrocarbon containing mesitylene mentioned above is easily available as a higher boiling fraction in the process of the isolation and purification of $C_8$-aromatic hydrocarbon in the recent petroleum chemical industry and is nowadays supplied as a cheap material for the production of aromatic hydrocarbon-formaldehyde resin.

Although the mesitylene-content in said alkylbenzene may suitably altered, for the sake of demonstrating sufficiently of the features of the laminates attained by the present invention, the mesitylene-content should be more than 50 percent, preferably more than 70 percent by weight. Suitable mesitylene-formaldehyde resins for the present invention are included within the oxygen-content of from 9 to 17 percent, preferably from 10 to 14 percent and an average molecular weight of from 250 to 600, preferably from 300 to 550.

The drying oil-phenols-modified mesitylene-formaldehyde resins used in the composition according to the invention include the resins, such as, for example, a tung oil-phenol-modified mesitylene-formaldehyde resin, linseed oil-phenol-modified mesitylene-formaldehyde resin, dehydrated castor oil-phenol-modified mesitylene-formaldehyde resin, tung oil-xylenol-modified mesitylene-formaldehyde resin, tung oil-m-cresol-modified mesitylene formaldehyde resin, tung oil-bisphenol A-modified mesitylene-formaldehyde resin and so on.

The drying oil-modified resol type phenolic resins used in the composition of the present invention are known, which may be obtained by cooking phenols with a drying oil in the presence of acid catalyst followed by reacting with formaldehyde in the presence of a basic catalyst. Said resin is used generally in the form of varnish dissolved in solvents such as mentioned above. The resol type water-soluble phenolic resin is known and may be obtained by reacting phenols with formaldehyde in the presence of a basic catalyst and is also used generally in the form of a varnish similar to the above mentioned resin.

The drying oil-modified resol type phenolic resins used in the present composition include the resins such as, for example, tung oil-modified resol type phenol resin, tung oil-modified resol type xylenol resin, dehydrated castor oil-modified resol type phenol resin and so on.

According to the invention although the above said drying oil-phenols-modified mesitylene formaldehyde resin, drying oil-modified resol type phenol resin and resol type water-soluble phenolic resin are admixed in a desired mixing proportion, it is generally admixed in the form of a varnish and the obtained varnish mixture is applied as impregnating varnish for base material.

For the production of laminates by the use of the resin composition of the present invention, a conventional process may be employed as it is.

For example, a varnish obtained by dissolving a resin composition according to the invention in a solvent is used for impregnating of the base material. As for the base material, any of synthetic and natural fabrics and sorts of paper, such as glass fabrics, glass mats, glass paper, glass cellulose-paper, cellulosic paper may be used.

The base material thus impregnated is dried and finished so as to effect prepregs having resin-content of 30 to 70 percent by weight, preferably 30 to 50 percent by weight.

The prepregs are laminated in a desired number of sheets, if desired by laminating a copper, nickel or aluminium foil upon the surface thereof and is pressed at a pressure of 20 to 200 kg/cm$^2$ and a temperature of 140° to 180°C for 20 to 180 minutes to obtain desired laminates.

The following examples are presented to further illustrate the present invention. Unless otherwise specified parts and percentage described in the examples are parts and percentage by weight.

Drying oil-phenols-modified mesitylene-formaldehyde resin, drying oil-modified resol type phenolic resin and resol type water-soluble phenolic resin used in the examples are prepared in the manner as shown in examples shown under:

Mesitylene-formaldehyde resin (1): which has an average molecular weight of 554 and oxygen-content of 11.4% by weight and may be obtained by reacting $C_9$-aromatic hydrocarbon containing 98% by weight of mesitylene with formaldehyde in the presence of an acid catalyst.

Mesitylene-formaldehyde resin (2): which has an average molecular weight of 470 and oxygen-content of 12.0% by weight and may be obtained by reacting $C_9$-aromatic hydrocarbons containing 74% by weight of mesitylene with formaldehyde in the presence of an acid catalyst.

Mesitylene-formaldehyde resin (3): which has an average molecular weight of 290, oxygen-content of 14.3% by weight and may be obtained by reacting $C_9$-aromatic hydrocarbons containing 38% by weight of mesitylene with formaldehyde in the presence of acid catalyst.

(I) DRYING OIL-PHENOLS-MODIFIED
MESITYLENE-FORMALDEHYDE RESIN
VARNISH

Example 1

A mixture of 200 parts of mesitylene-formaldehyde resin (containing 98% by weight of mesitylene, average molecular weight 554, oxygen-content 11.4%), 600 parts of phenol, 120 parts of tung oil and 1 part of toluene sulfonic acid is placed in a four-necked flask fitted with a stirrer, thermometer and reflux condenser and reacted at 130°C for one hour. After cooling to 50°C the reaction mixture is added with 500 parts of 37 percent aqueous formaldehyde solution and 6 parts of hexamethylenetetramine and heated under reflux for 2 hours and then after removing of water under a reduced pressure the residue is added with methanol to obtain a tung oil-phenol-modified mesitylene-formaldehyde resin varnish, which contains 60 percent of non-volatile matters.

Example 2

The same procedure as described in Example 1 is repeated, except that the mesitylene-formaldehyde resin (1) is replaced by the mesitylene-formaldehyde resin (2) mentioned above and then tung oil-phenol-modified mesitylene-formaldehyde varnish is obtained.

Comparative Example 1.

The same procedure as described in Example 1 is repeated, except that the mesitylene-formaldehyde resin (1) is replaced by the mesitylene-formaldehyde resin (3) mentioned above. A tung oil-phenol-modified mesitylene-formaldehyde resin varnish is obtained.

Example 3

A mixture of 135 parts of the mesitylene-formaldehyde resin (1), 750 parts of m-cresol (composed of 70% of meta-cresol and 30% of para-cresol), 400 parts of tung oil and 1 part of benzenesulfonic acid is placed in a same reactor as described in Example 1 and reacted at 130°C for one hour.

After cooling to 50°C the reaction mixture is added with 500 parts of 37% formalin and 10 parts of aqueous ammonia solution and heated under reflux for 1 hour, then after removing of water under reduced pressure the residue is added with a mixture of methanol and benzene and then a tung oil-m-cresol-modified mesitylene formaldehyde resin varnish is obtained.

Example 4

A mixture of 150 parts of mesitylene-formaldehyde resin (2), 700 parts of bis-phenol A, 300 parts of tung oil and 2 parts of p-toluenesulfonic acid is reacted at 130°C for 2 hours. After cooling to 50°C the reaction mixture is added with 400 parts of 37%-formalin and 8 parts of hexamethylenetetramine and heated under reflux for 2 hours, then after removing of water the residue is added with methyl ethyl ketone and thus a tung oil-bisphenol A-modified-mesitylene-formaldehyde resin varnish is obtained.

Example 5

A mixture of 200 parts of the mesitylene-formaldehyde resin (1), 600 parts of phenol, 100 parts of linseed oil and 3 parts of sulfuric acid is reacted at 160°C for 3 hours. After cooling to 60°C the reaction mixture is added with 500 parts of 37%-formalin and 5 parts of ethylenediamine and heated under reflux for 2 hours and then after removing of water the residue is added with methanol and thus a linseed oil-phenol-modified mesitylene-formaldehyde resin varnish is obtained.

Example 6

A mixture of 200 parts of the mesitylene-formaldehyde resin (1), 650 parts of phenol, 150 parts of dehydrated castor oil and 4 parts of p-toluenesulfonic acid is reacted at 130°C for 2 hours. After cooling to 50°C the reaction mixture is added with 500 parts of 37%-formalin and 6 parts of hexamethylenetetramine and heated under reflux for 2 hours, then after removing water the residue is added with methanol and thus a dehydrated castor oil-phenol-modified mesitylene-formaldehyde resin varnish is obtained.

(II) DRYING OIL-MODIFIED RESOL TYPE PHENOLIC RESIN VARNISH

Examply 7

A mixture of 500 parts of phenol, 200 parts of tung oil and 6 parts of 85%-phosphoric acid is reacted at 120°C for 3 hours and after cooling to 90°C the reaction mixture is added with 500 parts of 37%-formalin and 10 parts of aqueous ammonia. The mixture is reacted at 95°C for 3 hours and then after removing of water at a reduced pressure the residue is added with a mixture of methanol and xylene and thus a tung oil-modified resol type phenol-formaldehyde resin varnish containing 60% of non-volatile matter is obtained.

Example 8

A mixture of 550 parts of xylenol, 200 parts of tung oil and 4 parts of p-toluenesulfonic acid is reacted at 130°C for 2 hours and after cooling to 90°C the reaction mixture is added with 450 parts of 37%-formalin and 20 parts of aqueous ammonia. The mixture is reacted under reflux for 2 hours and after removing of water the residue is added with a mixture of methanol and benzene and thus a tung oil-modified resol type xylenol resin varnish containing 60% of non-volatile matter is obtained.

Example 9

A mixture of 500 parts of phenol, 220 parts of dehydrated castor oil and 2 parts of sulfuric acid is reacted at 130°C for one hour and after cooling to 90°C the reaction mixture is added with 500 parts of 37% formalin and 6 parts of p-toluenesulfonic acid. The mixture is then reacted under reflux for 2 hours and after removing of water the residue is added with a mixture of methanol and benzene and thus a dehydrated castor oil-modified resol type phenol resin varnish containing 60% of non-volatiles.

(III) WATER-SOLUBLE RESOL TYPE PHENOLIC RESIN VARNISH

Example 10

A mixture of 350 parts of phenol, 700 parts of 37% formalin and 6 parts of magnesium hydroxide is reacted at 50°C for 7 hours and after the removal of water at a reduced pressure the residue is added with methanol to obtain a water-soluble resol type phenolic resin varnish containing 60% of non-volatiles.

Example 11

A varnish of a tung oil-phenol-modified mesitylene-formaldehyde resin varnish obtained in Examples 1 and 2, varnish of a tung oil or castor oil-modified resol type phenolic resin obtained in Examples 7 and 9 and varnish of the resol type water-soluble phenolic resin obtained in Example 10 are blended in such proportions as shown in Table 1A to prepare varnish to be used for the impregnation of base material.

As for the base material, a 100% cotton linter paper is used and it is impregnated with a varnish mixture thus prepared and then dried to obtain a prepreg having resin-content of 45%.

Required number of sheets of the prepregs thus obtained are piled up one after another and furthermore a copper foil coated with an adhesive is laid thereon.

Subsequently the assembly thus obtained is pressed at 165° C under the pressure of 100 kg/cm² for 809 minutes to obtain a copper-clad laminate having a thickness of 1.6 mm.

Properties of the laminates thus obtained are shown in Table 1B.

The laminates of the prepregs thus obtained are prepared according to the method described in Example 11 and the properties thereof are shown in Table 2B.

Table 1A

| Resins | | A | B | C | D | E | F | G | P Comparison |
|---|---|---|---|---|---|---|---|---|---|
| Tung oil-phenol-modified mesitylene-formaldehyde resin according to the following Examples: (parts) | Example 1 | 10 | 20 | 50 | 80 | | 20 | 50 | |
| | Example 2 | | | | | 50 | | | |
| | Comparative Example | | | | | | | | 50 |
| Tung oil or castor oil-modified resol type phenolic resin according to the following Examples: (parts) | Example 7 | 90 | 80 | 50 | 20 | 50 | | 50 | |
| | Example 9 | | | | | | 50 | 50 | |
| Resol type water-soluble phenolic resin according to Example 10 (parts) | | 20 | 40 | 30 | 8 | 30 | 40 | 30 | 30 |

[1] For preparing drying oil-phenol-modified mesitylene-formaldehyde resin a mesitylene-formaldehyde resin having a mesitylene-content of more than 50% is used.

Table 1B

| Test Items | Standard | Treating Condition | A | B | C | D | E | F | G | P Comparison |
|---|---|---|---|---|---|---|---|---|---|---|
| Water absorption (%) | JIS K-6911(1970) | E-24/50** +D-24/23 | 0.32 | 0.34 | 0.30 | 0.29 | 0.32 | 0.31 | 0.40 | 0.61 |
| Insulation resistance ($\Omega$) | JIS K-6911(1970) | C-90/20/65** C-90/20/65** +D-2/100 | $3.4 \times 10^{13}$ $9.1 \times 10^{10}$ | $8.1 \times 10^{13}$ $8.3 \times 10^{10}$ | $2.1 \times 10^{14}$ $8.1 \times 10^{10}$ | $2.7 \times 10^{13}$ $2.6 \times 10^{10}$ | $1.5 \times 10^{14}$ $5.6 \times 10^{10}$ | $1.0 \times 10^{14}$ $7.0 \times 10^{10}$ | $4.9 \times 10^{13}$ $1.2 \times 10^{10}$ | $6.3 \times 10^{13}$ $0.1 \times 10^{10}$ |
| Dielectric constant (1 MC/Hz) | JIS K-6911(1970) | C-90/20/65** +D-48/50 | 4.08 4.21 | 4.12 4.19 | 3.92 4.18 | 3.87 3.99 | 3.95 4.16 | 4.28 4.29 | 4.34 4.52 | 4.41 4.62 |
| Punchability* | ASTM D-617 | as received | 23–70°C Excellent | 23–70°C Excellent | 60–80°C Excellent | 60–80°C Excellent | 60–80°C Excellent | 23–70°C Excellent | 60–80°C Excellent | 60–80°C Good |
| Flexural strength (kg/mm²) | JIS K-6911(1970) | as received | 23.4 | 21.8 | 22.5 | 21.2 | 21.8 | 20.4 | 20.5 | 19.5 |
| Solder heat resistance (sec.) | JIS C-6481(1968) | as received | 52–58 | 48–61 | 53–55 | 61–63 | 52–54 | 41–45 | 45–48 | 29–31 |
| Barcol Impressor | — | — | 37 | 41 | 45 | 42 | 45 | 40 | 44 | 45 |
| Releasing property of laminates from pressing plate | | | Good | Good | Good | Good | Good | Good | Good | Good |

Note:
*The temperatures in the column of "Punchability" refer to the optimum temperature at which the laminates are punched.
**In the column of "Testing Conditions":
 C: treated in the air at constant temperature and constant humidity.
 D: Soaked in distilled water.
 E: Treated in the air at constant temperature. The first figure refers to treating temperature (°C), the second figure refers to treating temperature (°C) and the third figure refers to relative humidity (%).

Example 12

A varnish of a tung oil-phenols-modified mesitylene-formaldehyde resin obtained in Examples 3 and 4, varnish of tung oil-modified resol type phenolic resin obtained in Example 7 and varnish of the resol type water-soluble phenolic resin obtained in Example 10 are blended in such proportions as shown in Table 2A to prepare varnish to be used for the impregnation of base material.

As for the base material, a 100% cotton linter paper is used and it is impregnated with a varnish mixture thus prepared and then dried to obtain prepreg having resin-content of 45%.

Table 2A

| Resins | | Resin Composition | |
|---|---|---|---|
| | | H | I |
| Tung oil-phenol-modified mesitylene-formaldehyde Resin [1] according to the following Examples: (parts) | Example 3 | 30 | |
| | Example 4 | | 50 |
| Tung oil-modified resol type phenolic resin according to Example 7 (parts) | | 70 | 50 |
| Resol type water-soluble phenolic resin according to Example 10 (parts) | | 30 | 30 |

[1] A mesitylene-formaldehyde resin having a mesitylene-content of more than 50% is used for the preparation.

Table 2B

| Test Items | Standard | Treating Conditions | H | I |
|---|---|---|---|---|
| Water absorption (%) | JIS K-6911(1970) | E-24/50** +D-24/23 | 0.41 | 0.38 |
| Insulation resistance (Ω) | JIS K-6911(1970) | C-90/20/65** | 8.9×10$^{13}$ | 3.5×10$^{14}$ |
| | | C-90/20/65** +D-2/100 | 3.5×10$^{10}$ | 6.2×10$^{10}$ |
| Dielectric constant (1 MC/Hz) | JIS K-6911(1970) | C-90/20/65** | 4.29 | 4.02 |
| | | C-90/20/65** +D-48/50 | 4.35 | 4.04 |
| Punchability* | ASTM D-617 | as received | 60–80°C Very good | 60–80°C Very good |
| Flexural strength (kg/mm$^2$) | JIS K-6911(1970) | as received | 19.9 | 19.4 |
| Solder heat resistance (sec.) | JIS C-6481(1968) | as received | 45–52 | 44–50 |
| Barcol impressor | — | — | 43 | 46 |
| Releasing property of laminates from pressing plate | | | Good | Good |

*As referred in Table 1B.
**As referred in Table 1B.

Example 13

A varnish of linseed oil or caster oil-phenol-modified mesitylene-formaldehyde resin varnish obtained in Examples 5 and 6, varnish of tung oil-modified resol type phenolic resin obtained in Example 7 and varnish of resol type water-soluble phenolic resin obtained in Example 10 are blended in such proportions as shown in Table 3A to prepare varnish to be used for the impregnation of base material.

As for the base material, a 100% cotton linter paper is used and the prepregs are obtained according to the method described in Example 12.

The laminates of the prepregs are prepared according to the method described in Example 11 and the properties thereof are shown in Table 3B.

Table 3A

| REsins | | Resin Composition | |
|---|---|---|---|
| | | J | K |
| Linseed oil or castor oil-phenol-modified mesitylene-formaldehyde resin[1] according to the following Examples: (parts) | Example 5 | 50 | |
| | Example 6 | | 50 |

Table 3A-continued

| REsins | Resin Composition | |
|---|---|---|
| | J | K |
| Tung oil modified resol type phenolic resin according to Example 7 (parts) | 50 | 50 |
| Resol type water-soluble phenolic resin according to Example 10 (parts) | 30 | 30 |

[1] A mesitylene-formaldehyde resin having mesitylene-content of more than 50% is used.

Table 3B

| Test Items | Standard | Treating Conditions | J | K |
|---|---|---|---|---|
| Water absorption (%) | JIS K-6911(1970) | E-24/50** +D-24/23 | 0.28 | 0.48 |
| Insulation resistance (Ω) | JIS K-6911(1970) | C-90/20/65** | 3.4×10$^{13}$ | 4.5×10$^{14}$ |
| | | C-90/20/65** +D-2/100 | 1.1×10$^{10}$ | 7.6×10$^{10}$ |
| Dielectric constant (1 MC/Hz) | JIS K-6911(1970) | C-90/20/65** | 4.48 | 4.11 |
| | | C-90/20/65** +D-48/50 | 4.58 | 4.18 |
| Punchability* | ASTM D-617 | as received | 60–80°C Very good | 60–80°C Excellent |
| Flexural strength (kg/mm$^2$) | JIS K-6911(1970) | as received | 19.8 | 20.4 |
| Solder heat resistance (sec.) | JIS C-6481(1968) | as received | 41–44 | 51–58 |
| Barcol impressor | — | — | 43 | 44 |
| Releasing property of laminates from pressing plate | | | Good | Good |

Note:
*As referred in Table 1B.
**As referred in Table 1B.

Example 14

A varnish of a drying oil-phenol-modified mesitylene-formaldehyde resin obtained in Examples 1, 2 and 6, a varnish of dehydrated castor oil or tung oil-modified resol type phenolic resin obtained in Examples 7, 8 and 9 and varnish of resol type water-soluble phenolic resin obtained in Example 10 are blended in such proportions as shown in Table 4A to prepare varnish to be used for the impregnation of base material.

As for the base material, 100% cotton linter paper is employed and it is impregnated with a varnish mixture obtained as above and thereafter treated as described in Example 11 and the properties of the obtained laminates are shown in Table 4B.

Table 4A

| Resins | Resin Composition | | | |
|---|---|---|---|---|
| | L | M | N | O |
| Tung oil or caster oil-phenol-modified mesitylene formaldehyde resin [1] according to the following Examples: (parts) | Example 1 | | | 80 |
| | Example 2 | | 50 | |
| | Example 6 | 20 | 50 | |
| Tung oil or dehydrated castor oil-modified resol type phenolic resin according to the following Examples: (parts) | Example 7 | 80 | | |
| | Example 8 | | 50 | 20 |
| | Example 9 | | 50 | |
| Resol type water-soluble phenolic resin according to Example 10 (parts) | | 40 | 30 | 30 | 8 |

[1] A mesitylene-formaldehyde resin having a mesitylene-content of more than 50% is used for the preparation.

Table 4B

| Test Items | Standard | Treating Conditions | L | M | N | O |
|---|---|---|---|---|---|---|
| Water absorption (%) | JIS K-6911(1970) | E-24/50** +D-24/23 | 0.33 | 0.33 | 0.41 | 0.42 |
| Insulation resistance ($\Omega$) | JIS K-6911(1970) | C-90/20/65** | $1.2 \times 10^{14}$ | $7.6 \times 10^{13}$ | $6.2 \times 10^{13}$ | $3.1 \times 10^{13}$ |
| | | C-90/20/65** +D-2/100 | $8.0 \times 10^{10}$ | $8.1 \times 10^{10}$ | $0.8 \times 10^{10}$ | $5.1 \times 10^{10}$ |
| Dielectric constant (1 MC/Hz) | JIS K-6911(1970) | C-90/20/65** | 4.23 | 4.08 | 4.41 | 4.02 |
| | | C-90/20/65** +D-48/50 | 4.29 | 4.20 | 4.51 | 4.16 |
| Punchability* | ASTM D-617 | as received | 23–70°C Excellent | 60–80°C Excellent | 60–80°C Excellent | 60–80°C Excellent |
| Flexural strength (kg/mm²) | JIS K-6911(1970) | as received | 20.3 | 19.6 | 19.0 | 20.6 |
| Solder heat resistance (sec.) | JIS C-6481(1968) | as received | 44–51 | 45–49 | 48–50 | 58–61 |
| Barcol impressor | — | — | 40 | 43 | 44 | 43 |
| Releasing property of laminates from pressing plate | | | Good | Good | Good | Good |

*As referred in Table 1B.
**As referred in Table 1B.

What is claimed is:

1. A composition for preparing laminates which comprises,
   A. a drying oil-phenols-modified mesitylene-formaldehyde resin, obtained by first reacting a mixture of a mesitylene-formaldehyde resin, phenols and drying-oils in the presence of acid catalyst, followed by reacting the obtained product with formaldehyde in the presence of basic catalyst,
   B. a drying oil modified resol type phenolic resin, obtained by first reacting phenols with drying-oils in the presence of acid catalyst, followed by reacting with formaldehyde in the presence of basic catalyst,
   C. a resol type water-soluble phenolic resin, obtained by reacting phenols with formaldehyde in the presence of basic catalyst,
wherein the amount of (A) to be mixed is from 5 to 95 parts by weight based on 100 parts of the sum of the amounts of (A) and (B) and the amount of (C) to be mixed is 5 to 45 parts by weight based on 100 parts of the sum of the amounts of (A) and (B).

2. Resin composition according to claim 1 wherein, as for phenols for modifying mesitylene-formaldehyde resin in Resin (A), phenol is used.

3. A resin composition according to claim 1, wherein said drying oil-phenols-modified mesitylene resin is at least one member selected from the group consisting of tung oil-phenol-modified mesitylene-formaldehyde resin, linseed oil-phenol-modified mesitylene-formaldehyde resin, dehydrated castor oil-phenol-modified mesitylene-formaldehyde resin, tung oil-xylenol-modified mesitylene-formaldehyde resin, tung oil-m-cresol-modified mesitylene-formaldehyde resin and tung oil-bisphenol A-modified mesitylene formaldehyde resin.

4. A resin composition according to claim 1, wherein said drying oil-modified resol type phenolic resin is at least one member selected from the group consisting of tung oil-modified resol type phenolic resin, tung oil-modified resol type xylenol resin and dehydrated castor oil-modified resol type phenol resin.

5. A resin composition according to claim 1, wherein said mesitylene-formaldehyde in resin (A) is a resin obtained by reacting $C_9$-aromatic hydrocarbons containing at least 50 percent of mesitylene with formaldehyde.

6. A resin composition according to claim 1, wherein said mesitylene-formaldehyde in resin (A) is a resin obtained by reacting $C_9$-aromatic hydrocarbons containing at least 70% of mesitylene with formaldehyde.

7. A varnish of the resin composition according to claim 1, which is obtained by mixing said resins A, B and C with one or more of solvents.

8. A varnish according to claim 7, wherein said solvent is selected from the group consisting of lower molecular alcohols, ketones and aromatic hydrocarbons.

9. A resin composition according to claim 3, wherein drying oil-phenols-modified mesitylene formaldehyde resin is tung oil-phenol-modified mesitylene formaldehyde resin.

* * * * *